United States Patent [19]

Akashi et al.

[11] Patent Number: 4,548,101
[45] Date of Patent: Oct. 22, 1985

[54] TRANSMISSION MECHANISM WITH PARALLEL TRANSMISSION SYSTEMS INCLUDING TORQUE CONVERTER IN THE FIRST SPEED ONE ONLY

[75] Inventors: Teruo Akashi; Hiroshi Ito; Shigemichi Yamada, all of Toyota, Japan

[73] Assignee: Toyota Jidosha Kabushiki Kaisha, Toyota, Japan

[21] Appl. No.: 465,796

[22] Filed: Feb. 11, 1983

[30] Foreign Application Priority Data

Jun. 18, 1982 [JP] Japan .................... 57-104733

[51] Int. Cl.[4] ............................... F16H 47/00
[52] U.S. Cl. ............................ 74/720; 74/718; 74/730; 74/330; 74/359
[58] Field of Search .......... 74/718, 720, 730, 330, 74/356, 357, 359, 360; 192/48.4

[56] References Cited

U.S. PATENT DOCUMENTS

| | | | |
|---|---|---|---|
| 2,344,656 | 3/1944 | Swennes | 74/720 |
| 2,722,844 | 11/1955 | Dodge | 74/730 X |
| 3,138,964 | 6/1964 | Stockton | 74/730 X |
| 3,175,411 | 3/1965 | McFarland | 74/330 |
| 3,222,947 | 12/1965 | Atkins et al. | 74/330 X |
| 4,461,188 | 7/1984 | Fisher | 74/356 X |
| 4,463,621 | 8/1984 | Fisher | 74/331 X |

FOREIGN PATENT DOCUMENTS

| | | | |
|---|---|---|---|
| 1249708 | 9/1967 | Fed. Rep. of Germany | 74/330 |
| 1370591 | 7/1964 | France | 74/720 |
| 882847 | 11/1961 | United Kingdom . | |
| 2078318 | 1/1982 | United Kingdom | 74/730 |
| 680923 | 9/1979 | U.S.S.R. | 74/359 |

Primary Examiner—Leslie A. Braun
Assistant Examiner—Joseph M. Rolnicki
Attorney, Agent, or Firm—Kenyon & Kenyon

[57] ABSTRACT

A power supplying member supplies rotational power in a certain rotational direction to a first member of the transmission, and a power receiving member takes out power from a second member. Several power transmission systems are provided between the first and the second member, which are selectively engagable so as to provide various speed stages between them. Each power transmission system has a clutching mechanism which either can be disconnected so as to freewheel in both rotational directions, or can be connected to transmit rotational power at least in the one rotational direction which is required for transmission of power through that power transmission system from the first member to the second member. A fluid torque converter is provided in the rotational power transmission path of only one of the power transmission systems which provides the lowest gearing ratio between the first member and the second member.

7 Claims, 4 Drawing Figures

TRANSMISSION MECHANISM WITH PARALLEL TRANSMISSION SYSTEMS INCLUDING TORQUE CONVERTER IN THE FIRST SPEED ONE ONLY

BACKGROUND OF THE INVENTION

The present invention relates to the field of transmission mechanisms for use in automatic gearboxes, and more particularly relates to such a transmission mechanism which provides various speed stages by use of several selectively engagable power transmission systems each of which is equipped with a clutching mechanism.

There is a known type of transmission mechanism for providing various speed stages between a first rotating member and a second rotating member, such as the crankshaft of an internal combustion engine and a power input member of a differential device of an automotive vehicle, which comprises several power transmission systems, each of which can selectively be engaged to provide transmission of rotational power at its own particular speed ratio (or typically any selectable one of a plurality of speed ratios) between the first and second members, and each of which has a clutching mechanism which either can be connected so as to thus transmit rotational power or can be disconnected so as not thus to transmit rotational power. These power transmission systems may each include a per se well known type of synchromesh device. By appropriately controlling the engagement and disengagement of the various clutching mechanisms, and concurrently controlling the selection of the various speed ratios of the synchromesh devices of the various power transmission systems, which may be done automatically by a transmission control system of a per se well known type so as to provide entirely automatic operation, it is therefore possible to automatically shift between a plurality of speed stages and to provide both powered and engine braking operation of the transmission as a whole.

A particular advantage of this form of transmission system is that it has in principle allowed the vehicle designed to dispense with the use of a fluid torque converter. This has eliminated the relatively great frictional loss inherent in the use of such a fluid torque converter. Further, since a synchromesh type transmission unit which can provide two different speed stages is much lighter and more compact than a planetary gear mechanism which also can provide two different speed stages, such a transmission system as outlined above is much more compact than, and is lighter than, a conventional type of full automatic transmission utilizing a torque converter and planetary gear mechanisms. Therefore during use a vehicle incorporating such a transmission system provides better fuel economy and performance.

However, this prior art type of transmission mechanism has suffered from the disadvantage that such a mode of operation requires very close and accurate control of the timing of the engagement and disengagement of the various clutching mechanisms, especially during starting off of the vehicle from rest. During starting off of the vehicle from rest, if the engagement of the one of the clutching mechanisms relating to the one of the power transmission systems which provides the first speed stage is too swift and positive, then the vehicle will tend to perform so called "jackrabbiting", which involves very jerky starting off from rest, may cause stalling of the internal combustion engine of the vehicle, and may also damage the various components of the transmissionn such as said clutching mechanism, for example. On the other hand, if the engagement of the one of the clutching mechanisms relating to the one of the power transmission systems which provides the first speed stage is too slow and mushy, then the vehicle will tend to start off very slowly and uncertainly, thus providing poor vehicle performance. Such a thusly necessitated very close control of the timing of the engagement and disengagement of the clutching mechanism relating to the one of the power transmission systems which provides the first speed stage has presented a severe disadvantage with respect to the realization of an automatic transmission incorporating such a transmission mechanism, because such close timing control is very difficult to ensure, especially after the transmission has been used for a long period of time and its operational time constants have altered with usage. For example, in the case of a hydraulic type transmission control system, changes in the viscosity of the hydraulic fluid therein and changes in the size of the various orifices of the control system can cause timing difficulties.

Further, difficulties also occur with regard to the accuracy of timing control required for the engagement and disengagement of the various clutching mechanisms, during shifting between the speed stages of the transmission mechanism. If the engagement of one of the clutching mechanisms occurs somewhat too late after the disengagement of the previously engaged transmission mechanism, then for a certain intermediate period the engine associated with the transmission will race, especially during a power on shift as during an acceleration type upshift of the transmission or during a kick down type downshift, and on the other hand if the engagement of one of the clutching mechanisms occurs somewhat too early before the disengagement of the previously engaged transmission mechanism is complete, then for a short time period very large torsional strains are liable to be put on various elements of the transmission, in consequence of such an attempt, effectively, to engage two different speed ratios at one time, and this can damage various elements of the transmission mechanism. Especially, good timing control is important in the case of a power on downshift of the transmission or a so called kick down, when the engine load is high, and snappy and accurate shifting of the speed stages is particularly important and difficult in such a case.

Another factor that is required to be taken account of in the design of a transmission mechanism for an automatic transmission is mountability in a vehicle. The friction engaging elements of a transmission such as the hydraulic clutches thereof are liable to be quite large in diameter, especially as compared with the diameters of the various gear wheels of the transmission, and especially in the case of a front engine rear wheel drive type of vehicle such as transmission mechanism as outlined above has presented the constructional difficulty that the amount of space available for mounting such large diameter clutching mechanisms has not been sufficient, since typically the rear end of an automatic transmission which utilizes such a transmission mechanism has been required to be housed under the floor of the passenger compartment of the vehicle, perhaps in a so called transmission tunnel thereof. On the other hand, in the case of a front engine front wheel drive type of vehicle such a transmission mechanism as outlined above has presented the constructional difficulty that the amount of axial space available for mounting the transmission has been very limited, which limits the axial length of the transmission as a whole.

Finally, it is almost a required characteristic of such a transmission mechanism that it should provide engine braking for the vehicle, at least in some of the speed stages thereof. Smooth starting off from rest of the vehicle, both forwards and backwards, are also very important, and it should not be necessary for unduly delicate control of the clutching mechanisms to be exerted in order to obtain this effect. Power loss in the transmission should be minimized. Further, within these above mentioned constraints, it is a general design objective of such an automatic transmission mechanism to be as light and compact as possible.

SUMMARY OF THE INVENTION

Accordingly, it is the primary object of the present invention to provide a transmission mechanism of the general sort described above, in which no particularly fine timing control of the clutching mechanisms is required in order to start the vehicle off from rest.

It is a further object of the present invention to provide such a transmission mechanism, in which no particularly fine timing control of the clutching mechanisms is required in order to shift between the speed stages.

It is a further object of the present invention to provide such a transmission mechanism, in which the shifting between speed stages is made particularly smooth.

It is a further object of the present invention to provide such a transmission mechanism, in which in particular downshifting during high engine load conditions is carried out snappily and accurately.

It is a further object of the present invention to provide such a transmission mechanism, in which engine braking is available in at least some of the speed stages.

It is a further object of the present invention to provide such a transmission mechanism, in which the radially large elements do not present a mounting obstacle, when the transmission is to be mounted in a vehicle.

It is a further object of the present invention to provide such a transmission mechanism, which is well adapted to be fitted to a front engine rear wheel drive type vehicle.

It is yet a further object of the present invention to provide such a transmission mechanism, which is short in its axial length.

It is yet a further object of the present invention to provide such a transmission mechanism, which is generally compact.

It is yet a further object of the present invention to provide such a transmission mechanism, which is light in weight.

It is a further object of the present invention to provide such a transmission mechanism, in which power loss is minimized.

It is a further object of the present invention to provide such a transmission mechanism, in the use of which vehicle starting off from rest is made smooth and yet sure.

It is a further object of the present invention to provide such a transmission mechanism, in the use of which vehicle performance is maximized.

It is a further object of the present invention to provide such a transmission mechanism, in the use of which fuel economy is maximized.

It is yet a further object of the present invention to provide such a transmission mechanism, which is cheap to manufacture.

According to the present invention, these and other objects are accomplished by a transmission mechanism for a vehicle, for receiving input of rotational power from a power supplying member which rotates in a particular rotational direction and for outputting rotational power to a power receiving member, comprising: (a) a first member which is rotatably mounted and which receives supply of said rotational power from said power supply member; (b) a second member which is rotatably mounted and which supplies rotational power to said power receiving member; (c) a plurality of selectively engagable power transmission systems for transmitting rotational power between said first member and said second member at various gearing ratios including a lowest gearing ratio; (d) each one of said plurality of power transmission system comprising a rotational power transmission path including a clutching mechanism which can be selectively controlled either to transmit rotational power at least in the rotational direction which is required for power transmission to be performed through said clutching mechanism, during the transmission of power from said power supplying member rotating in said particular rotational direction to said power receiving member via said one of said power transmission systems, or to freewheel in both rotational directions; and (e) a fluid torque converter provided in the rotational power transmission path of only one of said power transmission systems which provides the lowest gearing ratio between said first member and said second member.

According to such a structure, since the fluid torque converter is only provided in the rotational force transmission path of the one of the power transmission systems which provides the lowest gearing ratio between the first member and the second member, i.e. which provides the first speed stage of the transmission mechanism, but not in the rotational force transmission path of any of the others of the power transmission systems, therefore the energy consuming effect inevitable in the torque transmission operation of this fluid torque converter only occurs during the engagement of this particular power transmission system, as for example during the starting off of the vehicle in said first speed stage, and during the engagement of the others of the plurality of power transmission systems no energy loss is caused by the fluid torque converter. This is very helpful for improving the fuel efficiency and the performance characteristics of the vehicle during operation.

According to a more particular aspect of the present invention, these and other objects are more particularly achieved by a transmission mechanism for a vehicle as described above, wherein at least one of said clutching mechanisms is selectively controllable so as to be locked up so as to transmit rotational power in both rotational directions.

According to such a structure, engine braking is available in the speed stages provided by the power transmission system associated with said clutching mechanism.

According to another way of expression of such a particular aspect of the present invention, these and other objects are more particularly achieved by a transmission mechanism for a vehicle as first described above, wherein at least one of said clutching mechanisms is selectively controllable so as (a) to be locked up so as to transmit rotational power in both rotational directions, or (b) to transmit rotational power only in the rotational direction which is required for power transmission to be performed through said one of said clutching mechanisms, during the transmission of power from said power supplying member rotating in said particular rotational direction to said power receiving member via said one of said clutching mechanisms, and to freewheel in the other rotational direction; or (c) to freewheel in both rotational directions and not to transmit power in either rotational direction.

Likewise, again according to such a structure, engine braking is available in the speed stages provided by the power transmission system associated with said clutching mechanism.

According to another more particular aspect of the present invention, these and other objects are more particularly achieved by a transmission mechanism for a vehicle as first described above, wherein each of said power transmission systems is selectively engagable to any one of a plurality of states, and provides different gearing ratios between said first member and said second member, when engaged in the various ones of said plurality of states; and wherein, in the total ordered set of gearing ratios between said first member and said second member which are available by all said pluralities of states of all said power transmission systems, adjacent gearing ratios, excluding adjacent gear ratios of opposite sense, are never provided by different states of the same power transmission mechanism, but in every case are available from different power transmission mechanisms.

According to such a structure, shifting between adjacent gear ratios of the same sense may be conveniently and easily done in the fashion described above, since such gear ratios are never provided by the same one of the power transmission mechanisms.

According to another more particular aspect of the present invention, these and other objects are more particularly achieved by a transmission mechanism for a vehicle as first described above, wherein the one of said clutching mechanisms associated with said one of said power transmission systems which provides the lowest gearing ratio between said first member and said second member is selectively controllable so as to be locked up so as to transmit rotational power in both rotational directions.

According to such a structure, engine braking is available in the lowest or first speed stage which is provided by said one of said power transmission systems associated with said clutching mechanism.

According to another way of expression of such a particular aspect of the present invention, these and other objects are more particularly achieved by a transmission mechanism for a vehicle as first described above, wherein said one of said clutching mechanisms associated with said one of said power transmission systems which provides the lowest gearing ratio between said first member and said second member is selectively controllable so as (a) to be locked up so as to transmit rotational power in both rotational directions, or (b) to transmit rotational power only in the rotational direction which is required for power transmission to be performed through said one of said clutching mechanisms, during the transmission of power from said power supplying member rotating in said particular rotational direction to said power receiving member via said one of said clutching mechanisms, and to freewheel in the other rotational direction; or (c) to freewheel in both rotational directions and not to transmit power in either rotational direction.

Likewise, again according to such a structure, engine braking is available in the lowest or first speed stage which is provided by said one of said power transmission systems associated with said clutching mechanism.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

The present invention will now be described with reference to several preferred embodiments thereof, and with reference to the appended drawings.

THE FIRST PREFERRED EMBODIMENT

Figure 1:
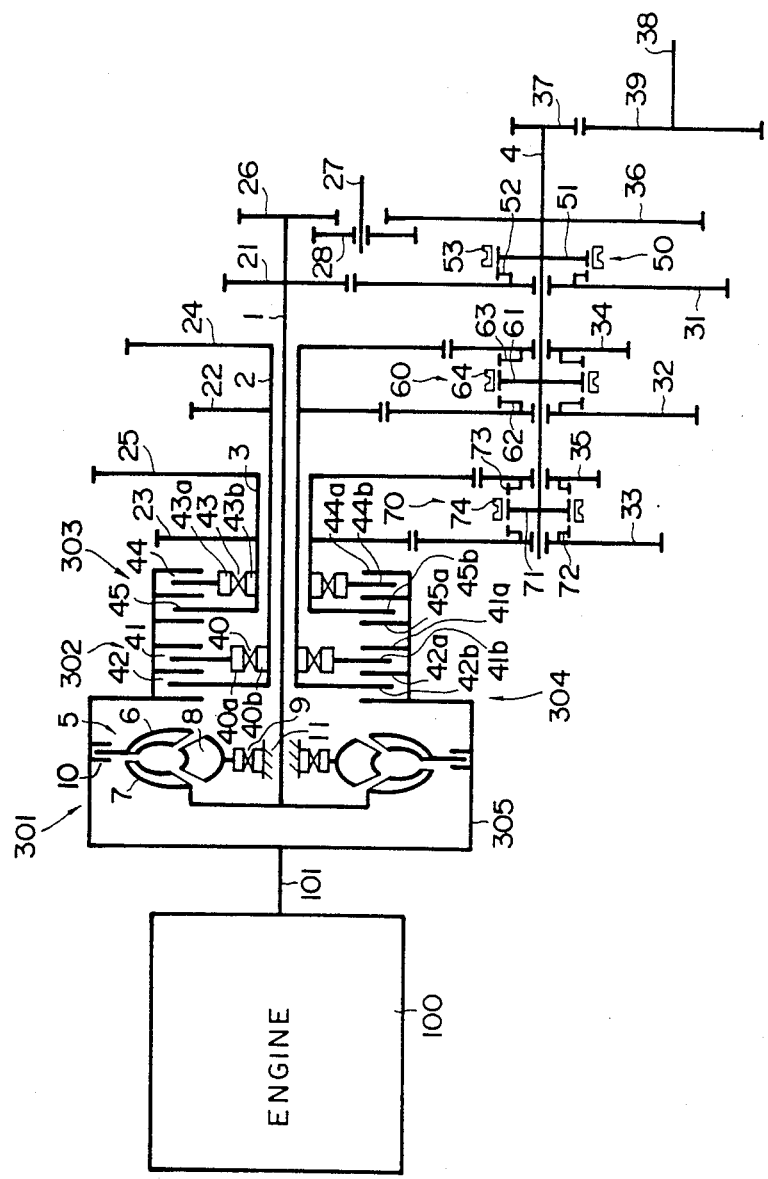
FIG. 1 is a schematic skeleton structural view of a transmission mechanism which is a first preferred embodiment of the transmission mechanism according to the present invention, also showing in schematic form an internal combustion engine associated therewith, this first preferred embodiment incorporating a clutch connected in series before a torque converter between the engine crankshaft and a driving gear wheel shaft which provides the first speed stage.

FIG. 1 is a schematic skeleton structural view of a transmission mechanism which is a first preferred embodiment of the transmission mechanism according to the present invention. In this figure, the reference numeral 100 denotes an internal combustion engine which is shown as a block, and 101 denotes the crankshaft of this internal combustion engine 100, which is rotated thereby in one rotational direction only, hereinafter termed the predetermined rotational direction, so as to transmit output rotational power from said internal combustion engine 100. This crankshaft 101 is directly drivingly coupled to an outer housing 305 of a multiple clutching mechanism 304. This multiple clutching mechanism 304 incorporates a first, a second, and a third clutching assembly, which are designated by the reference numerals 301, 302, and 303 respectively, and which according to a particular feature of the present invention are conveniently concentrated together into this single multiple clutching mechanism 304. Three coaxial power output shafts protrude from this multiple clutching mechanism 304 in the direction away from the internal combustion engine 100: a first driving gear wheel shaft 1, a tubular second driving gear wheel shaft 2 rotatably mounted on said first driving gear wheel shaft 1, out from the right hand end of which in FIG. 1 said first driving gear wheel shaft 1 protrudes to a certain extent, and a third tubular driving gear wheel shaft 3 rotatably mounted on said second driving gear wheel shaft 2, out from the right hand end of which said first and second driving gear wheel shafts 1 and 2 protrude to a certain extent. Parallel with the coaxial first, second, and third driving gear wheel shafts 1, 2, and 3 and displaced sideways therefrom there is provided a driven gear wheel shaft 4.

The structure of the multiple clutching mechanism 304 is as follows. The left hand part in the figure of said multiple clutching mechanism 304, i.e. the part cloest to the internal combustion engine 100, constitutes said first clutching assembly 301; the middle part in the figure of said multiple clutching mechanism 304 constitutes said second clutching assembly 302; and the right hand part in the figure of said multiple clutching mechanism 304 constitutes said third clutching assembly 303. As will be seen later, the second clutching assembly 302 can operate in any one of three operational modes, to either: (a) provide free wheeling action in both rotational directions, not transmitting power in either rotational direction; or (b) provide direct transmission of rotational power in one rotational direction only, while providing free wheeling action in the other rotational direction, said one rotational direction being the one which is required for power transmission to be performed through this part of the multiple clutching mechanism 304, during the transmission of power from the crankshaft 101 via said multiple clutching mechanism 304, i.e. said predetermined rotational direction; or (c) provide direct transmission of rotational power in both rotational directions. Further, the clutching assembly 303 operates in substantially the same manner as does the second clutching assembly 302, providing substantially the same function. On the other hand, the first clutching assembly 301 has a rather different function, being a series combination of a one way clutch and a torque converter, as will now be explained.

In the first clutching assembly 301, a fluid torque converter 5 is provided. This torque converter 5 is of a per se well known type, and comprises a pump impeller 6 rotationally coupled via a first clutch 10 to the crankshaft 101 of the engine 100, a stator member 8 mounted via a one way clutch 9 on a fixed member 11, and a turbine runner 7 rotationally coupled to the left hand end in the figure of the first driving wheel shaft 1. Thus, the first clutching assembly 301 functions as a series combination of a clutch and a torque converter. The construction of the first clutch 10 is per se well known. For example, in a preferred construction, this first clutch 10 may be a so called wet multiplate clutch. However, alternatively the first clutch 10, as well as the various clutches to be described later with respect both to this first preferred embodiment and also the other preferred embodiments, may be wet single plate clutches, or dry clutches, or conical clutches, or other types; the details are irrelevant, as are the systems of operation for engaging and disengaging these clutches, which need not necessarily be hydraulic systems, although this is convenient; electrical engagement and disengagement systems might also be utilized, in a variant embodiment.

Further, in the central part of the multiple clutching mechanism 304 in the figure, i.e. in the second clutching assembly 302, a second clutch 41 is provided, comprising a power input member 41a which is connected to the housing 305 of the multiple clutching mechanism 304 and which is thus directly rotationally connected to the crankshaft 101 of the engine 100, and a power output member 41b which is rotationally connected to a power input member 40a of a first one way clutch 40, the power output member 40b of which is rotationally connected to the left hand end in the figure of the second driving gear wheel shaft 2. The housing 305 of the multiple cluching mechanism 304 is also connected to a power input member 42a of a third clutch 42, the power output member 42b of which is also rotationally connected to the left hand end in the figure of the second driving gear wheel shaft 2. Thus, the third clutch 42 is connected in parallel with the series combination of the first one way clutch 40 and the second clutch 41, and this parallel combination is connected between the engine crankshaft 101 and the second driving gear wheel shaft 2.

Again, the construction of each of the second and third clutches 41 and 42 is per se well known. The structure of the first one way cluch 40 is per se well known, and its construction will not be further described herein. The function of this first one way clutch 40 is that, when its power input member 40a is rotating in the aforesaid predetermined rotational direction, its power output member 40b is constrained to rotate in said predetermined rotational direction at least as quickly.

Thus, the second clutching assembly 302 functions as follows. When the third clutch 42 is engaged, then the second clutching assembly 302 provides direct transmission of rotational power in both rotational directions. When the third clutch 42 is disengaged, then when the second clutch 41 is disengaged the second clutching assembly 302 provides freewheeling action in both rotational directions, not transmitting power in either rotational direction. On the other hand, when the second clutch 41 is engaged, as for example by supply of hydraulic fluid pressure to a pressure chamber thereof, but the third clutch 42 is disengaged, then the second clutching assembly 302 provides direct transmission of rotational power in one rotational direction only, while it provides freewheeling action in the other rotational direction, said one rotational direction being said predetermined rotational direction.

This particular type of clutching assembly, consisting essentially of the parallel combination of a clutch and the series combination of a clutch and a one way clutch, will hereinafter be termed a parallel—series clutching assembly. The reason for this nomenclature will become apparent hereinafter.

Finally, in the third clutching assembly 303, a fourth clutch 44 is provided, comprising a power input member 44a which is connected to the housing 305 and which is thus directly rotationally connected to the crankshaft 101 of the engine 100, and a power output member 44b rotationally connected to a power input member 43a of a second one way clutch 43, the power output member 43b of which is rotationally connected to the left hand end in the figure of the third driving gear wheel shaft 3. The housing 305 of the multiple clutching mechanism 304 is also connected to a power input member 45a of a fifth clutch 45, the power output member 45b of which is also rotationally connected to the left hand end in the figure of the third driving gear wheel shaft 3. Thus, the fifth clutch 45 is connected in parallel with the series combination of the second one way clutch 43 and the fourth clutch 44, and this parallel combination is connected between the engine crankshaft 101 and the third driving gear wheel shaft 3.

Again, the construction of each of the fourth and fifth clutches 44 and 45 is per se well known. The structure of the second one way clutch 43 is per se well known, and its construction will not be further described herein. The function of this second one way clutch 43 is that, when its power input member 43a is rotating in the aforesaid predetermined rotational direction, its power output member 43b is constrained to rotate in said predetermined rotational direction at least as quickly.

Thus, the fifth clutching assembly 303, similarly to the second clutching assembly 302, consists essentially of the parallel combination of a clutch and the series combination of a clutch and a one way clutch, and is a parallel—series clutching assembly.

On the driven gear wheel shaft 4 there are rotatably mounted, in order from the left to the right of FIG. 1, a third speed driven gear 33, a fifth speed driven gear 35, a second speed driven gear 32, a fourth speed driven gear 34, and a first speed driven gear 31; and to the right of these there are fixedly mounted in order a reverse speed driven gear 36 and a power output gear wheel 37, which is constantly meshed with a power transfer gear wheel 39 mounted on a power output shaft 38, the right hand end in the figure of which is prolonged, although this is not explicitly shown, so as to provide a rotational power taken off for the transmission mechanism shown, as for instance to a differential device of a vehicle.

On the portion of the first driving gear wheel shaft 1 which protrudes from the open end of the second driving gear wheel shaft 2 there are fixedly mounted, in order from the left to the right of FIG. 1, a first speed driving gear 21 and a reverse speed driving gear 26. On the portion of the second driving gear wheel shaft 2 which protrudes from the open end of the third driving gear wheel shaft 3 there are fixedly mounted, in order from the left to the right of FIG. 1, a second speed driving gear 22 and a fourth speed driving gear 24. On the third driving gear wheel shaft 3 there are fixedly mounted, in order from the left to the right of FIG. 1, a third speed driving gear 23 and a fifth speed driving gear 25. The first speed driving gear 21 is in constant mesh with the first speed driving gear 31; the second speed driving gear 22 is in constant mesh with the second speed driven gear 32; the third speed driving gear 23 is in constant mesh with the third speed driven gear 33; the fourth speed driving gear 24 is in constant mesh with the fourth speed driven gear 34; and the fifth speed driving gear 25 is in constant mesh with the fifth speed driven gear 35. Finally, on a reverse idler gear shaft 27 which is supported as parallel to the driving gear wheel shafts 1 through 3 and the driven gear wheel shaft 4 there is rotatably and slidably mounted a reverse idler gear 28. Arrangements of a per se well known sort, not shown in the figures, are provided for shifting this reverse idler gear 28 to and fro in the left and right directions in FIG. 1 on the reverse idler gear shaft 27; and, when the reverse idler gear 28 is in its most leftwards position in FIG. 1 on the reverse idler gear shaft 27, said reverse idler gear 28 does not mesh with any other gear wheels and is therefore free to rotate; but, when the reverse idler gear 28 is in its most rightwards position in FIG. 1 on the reverse idler gear shaft 27, said reverse idler gear 28 meshes with the reverse speed driving gear 26 and with the reverse speed driven gear 36, so as to provide a reverse speed stage, as will be explained later.

Between the first speed driven gear 31 and the fixed reverse speed driven gear 36 on the driven gear wheel shaft 4 there is fitted a first speed synchronizer 50, which performs the function of synchronizing engagement of the first speed stage. This first speed synchronizer 50 is of a per se well known sort, and comprises a hub 51 which is fixedly mounted on the driven gear wheel shaft 4, a set of first speed stage splines 52 provided integrally with the first speed driven gear 31, and a synchronizer sleeve 53 which is engaged by splines over the hub 51 so that it is rotationally coupled to the driven gear wheel shaft 4 but is free to slide axially thereon, which is either engagable to or disengagable from the first speed stage splines 52, respectively according as to whether it is slid to the left or the right on said hub 51 as seen in FIG. 1. The function of this first speed synchronizer 50 is to selectively rotationally couple the first speed driven gear 31 to the driven gear wheel shaft 4, according as to whether its sleeve 53 respectively is shifted leftwards or rightwards in the figure.

On the driven gear wheel shaft 4, between the second speed driven gear 32 and the fourth speed driven gear 34, there is fitted a second/fourth synchronizer 60, which performs the function of synchronizing engagement of the second speed stage and of the fourth speed stage. This second/fourth synchronizer 60 is also of a per se well known sort, and comprises a hub 61 which is fixedly mounted on the driven gear wheel shaft 4, a set of second speed stage splines 62 provided integrally with the second speed driven gear 32 and a set of fourth speed stage splines 63 provided integrally with the fourth speed driven gear 34, and a second/fourth synchronizer sleeve 64 which is engaged by splines over the hub 61 so that it is rotationally coupled to the driven gear wheel shaft 4 but is free to slide axially thereon, which is engagable to either the second speed stage splines 62 or the fourth speed stage splines 63, respectively according as to whether it is slid to the left or the right on said hub 61 as seen in FIG. 1. The function of this second/fourth synchronizer 60 is to rotationally couple either the second speed driven gear 32 or the fourth speed driven gear 34 or neither of them to the driven gear wheel shaft 4, according as its second-/fourth synchronizer sleeve 64 respectively is shifted to its leftmost position in the figure, is shifted to its rightmost position in the figure, or is shifted to an intermediate or middle position.

On the driven gear wheel shaft 4, between the third speed driven gear 33 and the fifth speed driven gear 35, there is fitted a third/fifth synchronizer 70, which performs the function of synchronizing engagement of the third speed stage and of the fifth speed stage. This third-/fifth synchronizer 70 is also of a per se well known sort, and comprises a hub 71 which is fixedly mounted on the driven gear wheel shaft 4, a set of third speed stage splines 72 provided integrally with the third speed driven gear 33 and a set of fifth speed stage splines 73 provided integrally with the fifth speed driven gear 35, and a third/fifth synchronizer sleeve 74 which is engaged by splines over the hub 71 so that it is rotationally coupled to the driven gear wheel shaft 4 but is free to slide axially thereon, which is engagable to either the third speed stage splines 72 or the fifth speed stage splines 73, respectively according as to whether it is slid to the left or the right on said hub 71 as seen in FIG. 1. The function of this third/fifth synchronizer 70 is to rotationally couple either the third speed driven gear 33 or the fifth speed driven gear 35 or neither of them to the driven gear wheel shaft 4; according as its third/fifth synchronizer sleeve 74 respectively is shifted to its leftmost position in the figure, is shifted to its rightmost position in the figure, or is shifted to an intermediate or middle position.

Now the operation of the transmission mechanism shown in FIG. 1 will be explained. In this connection, it should be understood that selective engagement and disengagement of the first, second, third, fourth, and fifth clutches 10, 41, 42, 44, and 45, which may be performed according to selective supply or non supply of actuating hydraulic fluid pressure to pressure chambers thereof or in some other manner, according to circumstances, is suitably performed according to operational parameters of the vehicle comprising this transmission mechanism by a control system for the automatic transmission of which the shown transmission mechanism according to the first preferred embodiment of the present invention forms part; and this control system will not be described herein with regard to its construction, because said control system does not directly form part of the present invention, and the functional explanation of its operation which will be given herein is sufficient for understanding of the principles of operation of the transmission mechanism according to the present invention. The movements leftwards and rightwards in FIG. 1 of the first speed synchronizer sleeve 53 of the first speed synchronizer 50, of the second/fourth synchronizer sleeve 64 of the second/fourth synchronizer 60, of the third/fifth synchronizer sleeve 74 of the third/fifth synchronizer 70, and of the reverse idler gear 28 on the reverse idler gear shaft 27, are also suitably selectively performed (using appropriate forks or the like or a per se well known sort) by this control system.

The engagement conditions of each of the first, second, third, fourth, and fifth clutches 10, 41, 42, 44, and 45, the positions of the first speed synchronizer sleeve 53 of the first/third synchronizer 50 and of the second/fourth synchronizer sleeve 64 of the second/fourth synchronizer 60 and of the third/fifth synchronizer sleeve 74 of the third/fifth synchronizer 70 as respectively engaged or disengaged to the first through fifth speed splines 52, 62, 63, 72, and 73, the position of the reverse idler gear 28 on the reverse idler gear shaft 27, and the engaged or over running conditions of the first and second one way clutches 40 and 43, will now be explained, during the engagement of each of the speed stages which can be provided by the transmission mechanism according to the first preferred embodiment of the present invention explained above, i.e. during the engagement of the neutral speed stage, the first forward speed stage, the second forward speed stage, the third forward speed stage, the fourth forward speed stage, the fifth forward speed stage, and the reverse speed stage; and also the sequences of shifting and of engagement and disengagement operations of these means which are employed in the various possible operations of shifting between these speed stages will be explained. This explanation will be made with reference to Table I, which is located at the end of this specification and before the claims appended thereto, and which is to be understood as incorporated into this specification at this point.

In Table I, there are shown, for each of the transmission speed stages that can be attained, the engagement conditions of the first, second, third, fourth, and fifth clutches 10, 41, 42, 44, and 45, the engagement or disengagement condition of the first speed stage splines 52 to the first speed synchronizer sleeve 53 of the first speed synchronizer 50 and the engagement or disengagement conditions of the second speed stage splines 62 and the fourth speed stage splines 63 to the second/fourth synchronizer sleeve 64 of the second/fourth synchronizer 60 and the engagement or disengagement conditions of the third speed stage splines 72 and the fifth speed stage splines 73 to the third/fifth synchronizer sleeve 74 of the third/fifth synchronizer 70, and the engaged or over running conditions of the first and second one way clutches 40 and 43, in this first preferred embodiment. In this Table, the symbol "E" indicates that the corresponding mechanism, i.e. the corresponding clutch or spline and sleeve mechanism, is engaged, and that this engagement is actually being used for transmission of rotational power; the symbol "D" indicates that the corresponding mechanism is disengaged; the symbol "e" indicates that the corresponding clutch or spline and sleeve mechanism is or may be engaged, but that this engagement is not actually currently utilized, since transmission of rotational power by the transmission is in any case ensured by the engagement of some other device which is provided in parallel with said clutch or spline and sleeve mechanism; the symbol "B", when used with relation to the third and fifth clutches 42 and 45 (only) indicates that the corresponding one of these clutches 42 and 45 is to be engaged when engine braking is required, as for example when the accelerator pedal is released; the symbol "A" indicates that the corresponding one way clutch is engaged, when the internal combustion engine 100 is urging the automotive vehicle along the road, i.e. in engine drive state; and the symbol "O" indicates that the corresponding one way clutch is disengaged, when the internal combustion engine 100 is urging the automotive vehicle along the road, i.e. in engine drive state.

NEUTRAL SPEED STAGE

In the neutral speed stage, which is schematically illustrated in FIG. 1, the clutches 10, 41, 42, 44, and 45 are all disengaged. At this time the second/fourth synchronizer sleeve 64 of the second/fourth synchronizer 60 is set to its intermediate position by the control system and the third/fifth synchronizer sleeve 74 of the third/fifth synchronizer 70 is set to its intermediate position by the control system, and further the first speed synchronizer sleeve 53 of the first speed synchronizer 50 may also be set to its intermediate position by the control system, or as a preparatory step to engaging the first speed stage said first speed synchronizer sleeve 53 may be shifted to the left in FIG. 1 so as to engage with the splines 52 for first speed stage. Because the clutches 10, 41, 42, 44, and 45 are none of them engaged, i.e. because the first, second, and third clutching assemblies 301, 302, and 303 are all in their completely disengaged states, none of the first through the third driving gear wheel shafts 1 through 3 is being rotationally driven by the internal combustion engine 100, but on the contrary all three of them are free; and accordingly no rotational force is being supplied to the driven gear wheel shaft 4. Thus the gear transmission mechanism according to the first preferred embodiment of the present invention functions in its neutral speed stage.

SHIFTING FROM NEUTRAL TO THE FIRST SPEED STAGE

In order to shift from the neutral speed stage into the first speed stage and to start the vehicle off from rest, first, as a preparatory action as mentioned above, the synchronizer sleeve 53 of the first speed synchronizer 50 is moved to its leftwardly displaced position as seen in FIG. 1 by the above mentioned transmission control system, so as rotationally to couple the first speed driven gear wheel 31 with the driven gear wheel shaft 4. No drive is yet transmitted at this time, because the first clutch 10 is still disengaged, i.e. the first clutching assembly 301 is still completely disengaged. Next, the first clutch 10 is smoothly engaged, while keeping the second, third, fourth, and fifth clutches 41, 42, 44, and 45 still disengaged. At this time, rotational power is transmitted from the crankshaft 101 of the internal engine 100 through the first clutch 10 and in a per se well known way through the fluid torque converter 5 to the first driving gear wheel shaft 1. From the first driving gear wheel shaft 1, this rotational power is transmitted via the first speed driving gear 21 to the first speed driven gear 31 in constant mesh therewith which transmits said rotation via the splines 52 and the sleeve 53 of the first speed synchronizer 50 engaged thereto to the driven gear wheel shaft 4, which outputs rotational power as explained above. Thus the vehicle is driven away from rest and operates in the first speed stage; and the per se well known cushioning effect of the fluid torque converter 5 is effective for mediating this starting off action, because said fluid torque converter 5 is located in this rotational force transmission path for the first speed stage, and because this torque converter 5 in a conventionally understood manner does not transmit substantial torque from its pump impeller 6 to its turbine runner 7 until the rotational speed of said pump impeller 6 (i.e. of the crankshaft 101 of the internal combustion engine 100) exceeds a predetermined value. Accordingly, no particularly delicate or subtle clutch operation is required for starting the vehicle away from rest in the first speed stage, since the per se well known operation of the torque converter 5 is available for smoothly performing such starting off.

During running in the first speed stage, engine braking is available, when the accelerator pedal of the vehicle is released, i.e. in engine overrunning condition, by the per se well known action of the torque converter 5 to transmit rotational power in the reverse direction to the one described above from the driven gear wheel shaft 4 to the crankshaft 101 of the internal combustion engine 100. However, this engine braking is mediated by the cushioning effect of the torque converter 5, and hence is not absolutely positive, and of course cannot proceed to such a degree that it is able to stall the internal combustion engine 100.

Duriing steady running in the first speed stage the second/fourth synchronizer sleeve 64 of the second-/fourth synchronizer 60 is set to its intermediate position by said control system, so that neither the second speed driven gear wheel 32 nor the fourth speed driven gear wheel 34 is rotationally connected to the driven gear wheel shaft 4; and also the third/fifth synchronizer sleeve 74 of the third/fifth synchronizer 70 is set to its intermediate position by said control system, so that neither the third speed driven gear wheel 33 nor the fifth speed driven gear wheel 35 is rotationally connected to the driven gear wheel shaft 4; however, as a preparatory action to engaging the second speed stage, in fact the second/fourth synchronizer sleeve 64 may be set to its leftwardly displaced position in FIG. 1 by the above mentioned transmission control system, so as rotationally to couple the second speed driven gear wheel 32 with the driven gear wheel shaft 4. This will cause no particular operational problem, because at this time the second clutch 41 and the third clutch 42 are still disengaged, and accordingly no rotational power is being supplied to the second driving gear wheel shaft 2.

The shifting from the first speed stage to the neutral speed stage is accomplished simply be disengaging the first clutch 10, and by returning the first speed synchronizer 50 and the second/fourth synchronizer 60 to their intermediate or disengaged positions, if either of them is not there yet.

UPSHIFTING FROM FIRST SPEED STAGE TO SECOND SPEED STAGE

In order to shift up from the first stage into the second speed stage, first, as a preparatory action as mentioned above, the second/fourth synchronizer sleeve 64 of the second/fourth synchronizer 60 is moved to its leftwardly displaced position in FIG. 1 by the transmission control system, so as rotationally to couple the second speed driven gear wheel 32 with the driven gear wheel shaft 4. No drive is yet transmitted at this time, because the second clutch 41 (and of course the third clutch 42 also) is still disengaged. Next, in order to actually perform the upshift, which of course will be during an engine drive condition and not during an engine overruning condition, the second clutch 41 is smoothly engaged, while keeping the third clutch 42 still disengaged. Further, substantially simultaneously but with a slight delay, the first clutch 10 is disengaged. As will be shortly explained, it is not necessary to disengage the first clutch 10 at exactly the same time as the second clutch 41 is engaged, and hence no particular complicated mutual control of the first clutch 10 and the second clutch 41 is required for the upshifting; this is a particular good feature of the present invention.

As the second clutch 41 becomes engaged, rotational power starts to be transmitted from the crankshaft 101 of the engine 100 through the second clutch 41 and the first one way clutch 40 to the second driving gear wheel shaft 2. It should be specially noted that the torque converter 5 is not involved in this rotational force transmission path, which instead only utilizes the outer casing 305 of the multiple clutching mechanism 304. From the second driving gear wheel shaft 2, this rotational power is transmitted from the second speed driving gear 22 fixedly mounted thereon to the second speed driven gear 32, which transmits said rotation via the splines 62 and the second/fourth synchronizer 60 engaged thereto to the driven gear wheel shaft 4, thus outputting rotational power.

At this time the turbine runner 7 of the torque converter 5 will be rotated at a substantially greater speed than the pump impeller 6 thereof, but this will present no problem, if it is over a fairly brief time interval. Accordingly no question of locking up of the transmission can occur during the period that the first clutch 10 and the second clutch 41 are both engaged, provided that this time period is relatively short. Thus the vehicle comes to operate in the second speed stage. However, shortly after this upshift, the first clutch 10 is disengaged, so as to stop slippage of the torque converter 5. At a convenient time, such as after the lapse of a predetermined time, during steady running in the second speed stage, the first speed synchronizer sleeve 53 of the first speed synchronizer 50 may be returned to the intermediate position, so as to stop the first clutch 10 from free wheeling and so as to preserve the life of said first clutch 10; but this returning of the sleeve 53 is not actually urgent.

As soon as the first clutch 10 becomes disengaged, the torque converter 5 as a whole stops rotating, i.e. its pump impeller 6 is rotationally disconnected from the crankshaft 101 of the internal combustion engine 100. Accordingly, the power loss in this torque converter 5 becomes exactly zero.

If, during running in the second speed stage, engine braking is currently required, for example when the accelerator pedal of the vehicle is released, then the third clutch 42 is engaged, while otherwise it is disengaged. If the third clutch 42 is engaged in engine overrunning condition, so as to bypass the action of the first one way clutch 40, rotational power can be transmitted in the reverse direction to the one described above via this third clutch 42 from the driven gear wheel shaft 4 to the crankshaft 101 of the engine 100 in order to provide engine braking, and otherwise during engine overrunning condition the first one way clutch 40 runs free or overruns, thus not providing any engine braking and allowing the vehicle to free wheel or coast.

Further, during running in the second speed stage the synchronizer sleeve 53 of the first speed synchronizer 50 may be set to its intermediate position by said control system, so that the first speed driven gear wheel 31 is not rotationally connected to the driven gear wheel shaft 4; however, as a preparatory action to a downshift for engaging the first speed stage in fact the first speed synchronizer sleeve 53 may be set to its leftwardly displaced position in FIG. 1 by the above mentioned transmission control system, so as rotationally to couple the first speed driven gear wheel 31 with the driven gear wheel shaft 4. Also, during such steady running in the second speed stage, generally the synchronizer sleeve 74 of the third/fifth synchronizer 70 may be set to its intermediate position by said control system, so that neither the third speed driven gear wheel 33 nor the fifth speed driven gear wheel 35 is rotationally connected to the driven gear wheel shaft 4; however, as a preparatory action to engaging the third speed stage in fact the synchronizer sleeve 74 may be set to its leftwardly displaced position in FIG. 1 by the above mentioned transmission control system, so as rotationally to couple the third speed driven gear wheel 33 with the driven gear wheel shaft 4. Neither of these actions will cause any particular operational problem, because at this time the first clutch 10 and the fourth clutch 44 are still disengaged.

DOWNSHIFTING FROM SECOND SPEED STAGE TO FIRST SPEED STAGE

During running in the second speed stage the first speed synchronizer sleeve 53 of the first speed synchronizer 50 may be kept at its intermediate position by said control system, so that the first speed driven gear wheel 31 is not rotationally connected to the driven gear wheel shaft 4; however, as a preparatory action to engaging the first speed stage when downshifting thereto from the second speed stage, the first speed synchronizer sleeve 53 is set to its leftwardly displaced position as seen in FIG. 1 by the transmission control system, so as rotationally to couple the first speed driven gear wheel 31 with the driven gear wheel shaft 4. This will cause no particular operation problem, because at this time the first clutch 10 is still disengaged.

Next, in order to actually perform the downshift, which may either be during engine drivve condition in the case of a kick down type downshift or may be in engine overrunning condition in the case of an engine braking desirable type downshift, simply the second clutch 41 is smoothly disengaged, and the third clutch 42 is disengaged if it is engaged, and substantially simultaneously the first clutch 10 is engaged.

As this occurs, the rotational speed of the internal combustion engine 100 will quickly increase to a rotational speed at which rotational power starts to be transmitted from the crankshaft 101 of the engine 100 through the first clutch 10 and the torque converter 5 to the first driving gear wheel shaft 1, and thence via the first speed driving gear 21 to the first speed driven gear 31 engaged therewith which transmits said rotation via the splines 52 and the first speed synchronizer 50 engaged thereto to the driven gear wheel shaft 4, thus outputting rotational power, now at a gearing ratio appropriate to the first speed stage.

Thus the vehicle comes to operate in the first speed stage. At a convenient time, such as after the lapse of a predetermined time, during running in the first speed stage, the synchronizer sleeve 64 of the second/fourth synchronizer 60 may be returned to the intermediate position, so as to stop the second clutch 41 from slipping and so as to preserve the life of said second clutch 41.

UNSHIFTING FROM SECOND SPEED STAGE TO THIRD SPEED STAGE

In order to shift up from the second speed stage to the third speed stage, first, as a preparatory action as mentioned above, the synchronizer sleeve 74 of the third-/fifth synchronizer 70 is moved to its leftwardly displaced position in FIG. 1 by the transmission control system, so as rotationally to couple the third speed driven gear wheel 33 with the driven gear wheel shaft 4. No drive is yet transmitted at this time, because the fourth clutch 44 (and of course also the fifth clutch 45) is still disengaged. Next, in order to actually perform the upshift, which of course will be during engine drive condition and not during an engine overrunning condition, the fourth clutch 44 is smoothly engaged, while keeping the second clutch 41 still engaged, and after disengaging the third clutch 42 if it was engaged previously. It is not necessary yet at this time to disengage the second clutch 41, and hence no particular complicated mutual control of the fourth clutch 44 and the second clutch 41 is required for the upshifting; this is another particular good feature of the present invention. As the fourth clutch 44 becomes engaged, rotational power starts to be transmitted from the crankshaft 101 of the engiine 100 through the fourth clutch 44 and the second one way clutch 43 to the third driving gear wheel shaft 3. From the third driving gear wheel shaft 3, this rotational power is transmitted via the third speed driving gear 23 fixedly mounted thereon to the third speed driven gear 33 engaged therewith which transmits said rotation via the splines 72 and the third-/fifth synchronizer 70 engaged thereto to the driven gear wheel shaft 4, thus outputting rotational power at a gear ratio appropriate to the third speed stage; and at this time automatically the first one way clutch 40 starts to run free or overrun, since the rotational speed (in the predetermined rotational direction) of its power input member 40a now becomes less relative to the rotational speed of its power output member 40b. Accordingly no question of locking up of the transmission can occur. Thus the vehicle comes to operate in the third speed stage. At a convenient time, such as after the lapse of a predetermined time, during running in the third speed stage, the synchronizer sleeve 64 of the second/fourth synchronizer 60 may be returned to the intermediate position, so as to stop the first one way clutch 40 from free wheeling and so as to preserve the life of said first one way clutch 40; and also the second clutch 41 is disengaged.

During running in the third speed stage the synchronizer sleeve 64 of the second/fourth synchronizer 60 may be set to its intermediate position by said control system, so that neither the second speed driven gear wheel 32 nor the fourth speed driven gear wheel 42 is rotationally connected to the driven gear wheel shaft 4; however, as a preparatory action to engaging the second speed stage or the fourth speed stage, respectively, in fact the second/fourth synchronizer sleeve 64 may be set to its leftwardly or its rightwardly displaced position in FIG. 1 by the above mentioned transmission control system, so as rotationally to couple, respectively, either the second speed driven gear wheel 32 or the fourth speed driven gear wheel 42 with the driven gear wheel shaft 4. Neither of these actions will cause any particular operational problem, because at this time the second clutch 41 (and of course the third clutch 42) is still disengaged; and in the case of a downshift to second speed stage in any case the first one way clutch 40 could operate to run free, even if the second clutch 41 were engaged.

If, during running in the third speed stage, engine braking ic currently required, for example when the accelerator pedal of the vehicle is released, then the fifth clutch 45 is engaged, while otherwise it is disengaged. If the fifth clutch 45 is engaged in engine overrunning condition, so as to bypass the action of the second one way clutch 43, rotational power can be transmitted in the reverse direction to the one described above via this fifth clutch 45 from the driven gear wheel shaft 4 to the crankshaft 101 of the engine 100 in order to provide engine braking, and otherwise during engine overrunning condition the second one way clutch 43 runs free or overruns, thus not providing any engine braking and allowing the vehicle to free wheel or coast.

DOWNSHIFTING FROM THIRD SPEED STAGE TO SECOND SPEED STAGE

During running in the third speed stage the synchronizer sleeve 64 of the second/fourth synchronizer 60 is kept at its intermediate position by said control system, so that neither the second speed driven gear wheel 32 nor the fourth speed driven gear wheel 42 is rotationally connected to the driven gear wheel shaft 4; however, as a preparatory action to engaging the second speed stage when downshifting thereto from the third speed stage, the second/fourth synchronizer 60 is set to its leftwardly displaced position as seen in FIG. 1 by the transmission control system, so as rotationally to couple the second speed driven gear wheel 32 with the driven gear wheel shaft 4. This will cause no particular operational problem, because at this time the second clutch 41 is still disengaged, and of course so is the third clutch 42. Next, also as a preparatory action, the second clutch 41 is engaged. As before, as explained above, this will cause the first one way clutch 40 to run free or overrun.

Next, in order to actually perform the downshift, which may either be during engine drive condition in the case of a kick down type downshift or may be in engine overrunning condition in the case of a reducing road speed type downshift, simply the fourth clutch 44 is smoothly disengaged. At this time of course the fifth clutch 45 should also be in the disengaged condition. Since at this time the second clutch 41 is already engaged, hence no particular complicated mutual control of the fourth clutch 44 and the second clutch 41 is required for the downshifting; this is another particular good feature of the present invention.

As the fourth clutch 44 becomes disengaged, if this is a case of a kick down type downshift, then the rotational speed of the internal combustion engine 100 will quickly increase to a rotational speed at which the first one way clutch 40 will stop running free, so that now rotational power starts to be transmitted from the crankshaft 101 of the engine 100 through the second clutch 41 and the first one way clutch 40 to the second driving gear wheel shaft 2, and thence via the second speed driving gear 22 to the second speed driven gear 32 engaged therewith which transmits said rotation via the splines 62 and the second/fourth synchronizer 60 engaged thereto to the driven gear wheel shaft 4, thus outputting rotational power, now at a gearing ratio appropriate to the second speed stage.

On the other hand, as the fourth clutch 44 becomes disengaged, if this is not a case of a kick down type downshift, but is a case of a power off type downshift, then at this time automatically the first one way clutch 40 continues to run free or overrun, and the vehicle is allowed to free wheel or coast. As explained above, engine braking may be available, in this first preferred embodiment, in the second speed stage, by subsequently engaging the third clutch 42.

Thus the vehicle comes to operate in the second speed stage. At a convenient time, such as after the lapse of a predetermined time, during running in the second speed stage, the synchronizer sleeve 74 of the third/fifth synchronizer 70 may be returned to the intermediate position, so as to stop the fourth clutch 44 and the fifth clutch 45 from slipping and so as to preserve the life of said fourth and fifth clutches 44 and 45.

UPSHIFTING FROM THIRD SPEED STAGE TO FOURTH SPEED STAGE

In order to shift up from the third speed stage into the fourth speed stage, first, as a preparatory action as mentioned above, the second/fourth synchronizer sleeve 64 of the second/fourth synchronizer 60 is moved to its rightwardly displaced position as seen in FIG. 1 by the transmission control system, so as rotationally to couple the fourth speed driven gear wheel 34 with the driven gear wheel shaft 4. No drive is yet transmitted at this time, because the second clutch 41 (and of course the third clutch 42) is still disengaged. As another preparatory action, also, the fifth clutch 45 is disengaged, if previously it was engaged. Next, in order to actually perform the upshift, which of course will be during engine drive condition and not during an engine overrunning condition, the second clutch 41 is smoothly engaged. As will be shortly explained, it is not necessary yet at this time to disengage the fourth clutch 44, and hence no particular complicated mutual control of the fourth clutch 44 and the second clutch 41 is required for the upshifting; this is yet another particular good feature of the present invention. As the second clutch 41 becomes engaged, rotational power starts to be transmitted from the crankshaft 101 of the engine 100 through the second clutch 41 and the first one way clutch 40 to the second driving gear wheel shaft 2. From the second driving gear wheel shaft 2, this rotational power is transmitted directly via the fourth speed driving gear 24 fixedly mounted thereon and the fourth speed driven gear 34 engaged therewith and via the second/fourth synchronizer 60 engaged thereto to the driven gear wheel shaft 4, thus outputting rotational power at a gearing ratio now appropriate to the fourth speed stage; and at this time automatically the second one way clutch 43 starts to run free or overrun, since the rotational speed (in the predetermined rotational direction) of its power input member 43a now becomes less relative to the rotational speed of its power output member 43b. Accordingly no question of locking up of the transmission can occur. Thus the vehicle comes to operate in the fourth speed stage. At a convenient time, such as after the lapse of a predetermined time, during running in the fourth speed stage, the synchronizer sleeve 74 of the third/fifth synchronizer 70 may be returned to the intermediate position, so as to stop the second one way clutch 43 from free wheeling and so as to preserve the life of said second one way clutch 43; and also the fourth clutch 44 is disengaged.

If, during running in the fourth speed stage, engine braking is currently required, for example when the accelerator pedal of the vehicle is released, then the third clutch 42 is engaged, while otherwise it is disengaged. If the third clutch 42 is engaged in engine overrunning condition, so as to bypass the action of the first one way clutch 40, rotational power can be transmitted in the reverse direction to the one described above via this third clutch 42 from the driven gear wheel shaft 4 to the crankshaft 101 of the engine 100 in order to provide engine braking, and otherwise during engine overrunning condition the first one way clutch 40 runs free or overruns, thus not providing any engine braking and allowing the vehicle to free wheel or coast.

Further, during running in the fourth speed stage the synchronizer sleeve 74 of the third/fifth synchronizer 70 may be set to its intermediate position by said control system, so that neither the third speed driven gear wheel 33 nor the fifth speed driven gear wheel 35 is rotationally connected to the driven gear wheel shaft 4; however, as a preparatory action to engaging the third speed stage, in fact the third/fifth synchronizer sleeve 74 may be set to its leftwardly displaced position as seen in FIG. 1 by the above mentioned transmission control system, so as rotationally to couple the third speed driven gear wheel 33 with the driven gear wheel shaft 4. Alternatively, as a preparatory action to engaging the fifth speed stage, in fact the third/fifth synchronizer sleeve 74 may be set to its rightwardly displaced position as seen in FIG. 1 by the above mentioned transmission control system, so as rotationally to couple the fifth speed driven gear wheel 35 with the driven gear wheel shaft 4. Neither of these actions will cause any particular operational problem, because at this time the fourth clutch 44 (and of course also the fifth clutch 45) is still disengaged; and in any case in the case of a prospective downshift to the third speed stage the second one way clutch 43 could operate to run free, even if the fourth clutch 44 were engaged.

DOWNSHIFTING FROM FOURTH SPEED STAGE TO THIRD SPEED STAGE

During running in the fourth speed stage the first/third synchronizer sleeve 74 of the third/fifth synchronizer 70 may be kept at its intermediate position by said control system, so that the third speed driven gear wheel 33 is not rotationally connected to the driven gear wheel shaft 4; however, as mentioned above as a preparatory action to engaging the third speed stage when downshifting thereto from the fourth speed stage, the third/fifth synchronizer sleeve 74 of the third/fifth synchronizer 70 may be set to its leftwardly displaced position as seen in FIG. 1 by the transmission control system, so as rotationally to couple the third speed driven gear wheel 33 with the driven gear wheel shaft 4. This will cause no particular operational problem, because at this time the fourth clutch 44 and the fifth clutch 45 are still disengaged. Next, also as a preparatory action, the fourth clutch 44 is engaged. As before, as explained above, this will cause the second one way clutch 43 to run free or overrun.

Next, in order to actually perform the downshift, which may either be during engine drive condition in the case of a kick down type downshift or may be in engine overrunning condition in the case of an engine braking desirable type downshift, simply the second clutch 41 is smoothly disengaged, while of course keeping the third clutch 42 disengaged. Since at this time the fourth clutch 44 is already engaged, hence no particular complicated mutual control of the fourth clutch 44 and the second clutch 41 is required for the downshifting; this is yet another particular good feature of the present invention.

As the second clutch 41 becomes disengaged, if this is a case of a kick down type downshift, then the rotational speed of the internal combustion engine 100 will quickly increase to a rotational speed at which the second one way clutch 43 will stop running free, so that now rotational power starts to be transmitted from the crankshaft 101 of the engine 100 through the fourth clutch 44 and the second one way clutch 43 to the third driving gear wheel shaft 3, and thence via the third speed driving gear 23 to the third speed driven gear 33 engaged therewith which transmits said rotation via the splines 72 and the third/fifth synchronizer 70 engaged thereto to the driven gear wheel shaft 4, now outputting rotational power at a gearing ratio appropriate to the third speed stage.

On the other hand, as the second clutch 41 becomes disengaged, if this is not a case of a kick down type downshift, but is a case of a power off type downshift, then at this time automatically the second one way clutch 43 continues to run free or overrun, and the vehicle is allowed to free wheel or coast. As explained above, engine braking may be available, in the third speed stage, by subsequently engaging the fifth clutch 45.

Thus the vehicle comes to operate in the third speed stage. At a convenient time, such as after the lapse of a predetermined time, during running in the third speed stage, the synchronizer sleeve 64 of the second/fourth synchronizer 60 may be returned to the intermediate position, so as to stop the second clutch 41 from slipping and so as to preserve the life of said second clutch 41.

UPSHIFTING FROM FOURTH SPEED STAGE TO FIFTH SPEED STAGE

In order to shift up from the fourth speed stage into the fifth speed stage, first, as a preparatory action as mentioned above, the synchronizer sleeve 74 of the third/fifth synchronizer 70 is moved to its rightwardly displaced position in FIG. 1 by the transmission control system, so as rotationally to couple the fifth speed driven gear wheel 35 with the driven gear wheel shaft 4. No drive is yet transmitted at this time, because the fourth clutch 44 (and of course also the fifth clutch 45) is still disengaged. Next, in order to actually perform the upshift, which of course will be during engine drive condition and not during an engine overrunning condition, the fourth clutch 44 is smoothly engaged, while keeping the second clutch 41 still engaged, and after of course disengaging the third clutch 42 if it was engaged previously. It is not necessary yet at this time to disengage the second clutch 41, and hence no particular complicated mutual control of the fourth clutch 44 and the second clutch 41 is required for the upshifting; this is another particular good feature of the present invention. As the fourth clutch 44 becomes engaged, rotational power starts to be transmitted from the crankshaft 101 of the engine 100 through the fourth clutch 44 and the second one way clutch 43 to the third driving gear wheel shaft 3. From the third driving gear wheel shaft 3, this rotational power is transmitted via the fifth speed driving gear 25 fixedly mounted thereon to the fifth speed driven gear 35 engaged therewith which transmits said rotation via the splines 73 and the third-/fifth synchronizer 70 engaged thereto to the driven gear wheel shaft 4, thus outputting rotational power at a gear ratio appropriate to the fifth speed stage; and at this time automatically the first one way clutch 40 starts to run free or overrun, since the rotational speed (in the predetermined rotational direction) of its power input member 40a now becomes less relative to the rotational speed of its power output member 40b. Accordingly no question of locking up of the transmission can occur, provided that at this time the third clutch 42 is definitely disengaged as specified above. Thus the vehicle comes to operate in the fifth speed stage. At a convenient time, such as after the lapse of a predetermined time, during running in the fifth speed stage, the synchronizer sleeve 64 of the second/fourth synchronizer 60 may be returned to the intermediate position, so as to stop the first one way clutch 40 from free wheeling and so as to preserve the life of said first one way clutch 40; and also the second clutch 41 is disengaged.

During running in the fifth speed stage the synchronizer sleeve 64 of the second/fourth synchronizer 60 may be set to its intermediate position by said control system, so that neither the second speed driven gear wheel 32 nor the fourth speed driven gear wheel 34 is rotationally connected to the driven gear wheel shaft 4; however, as a preparatory action to engaging the fourth speed stage, in fact the second/fourth synchronizer sleeve 64 may be set to its rightwardly displaced position in FIG. 1 by the above mentioned transmission control system, so as rotationally to couple the fourth speed driven gear wheel 34 with the driven gear wheel shaft 4. This action will not cause any particular operational problem, because at this time the second clutch 41 (and of course the fifth clutch 44) is still disengaged; and in any case the first one way clutch 40 could operate to run free, even if the second clutch 41 were engaged.

If, during running in the fifth speed stage, engine braking is currently required, for example when the accelerator pedal of the vehicle is released, then the fifth clutch 45 is engaged, while otherwise it is disengaged. If the fifth clutch 45 is engaged in engine overrunning condition, so as to bypass the action of the second one way clutch 43, rotational power can be transmitted in the reverse direction to the one described above via this fifth clutch 45 from the driven gear wheel shaft 4 to the crankshaft 101 of the engine 100 in order to provide engine braking, and otherwise during engine overrunning condition the second one way clutch 43 runs free or overruns, thus not providing any engine braking and allowing the vehicle to free wheel or coast.

DOWNSHIFTING FROM FIFTH SPEED STAGE TO FOURTH SPEED STAGE

During running in the fifth speed stage the synchronizer sleeve 64 of the second/fourth synchronizer 60 may be kept at its intermediate position by said control system, so that the fourth speed driven gear wheel 34 is not rotationally connected to the driven gear wheel shaft 4; however, as a preparatory action to engaging the fourth speed stage when downshifting thereto from the fifth speed stage, the second/fourth synchronizer 60 may be set to its rightwardly displaced position as seen in FIG. 1 by the transmission control system, so as rotationally to couple the fourth speed driven gear wheel 34 with the driven gear wheel shaft 4. This will cause no particular operational problem, because at this time the second clutch 41 is still disengaged, and of course so is the third clutch 42. Next, also as a preparatory action, the second clutch 41 is engaged. As before, as explained above, this will cause the first one way clutch 40 to run free or overrun.

Next, in order to actually perform the downshift, which may either be during engine drive condition in the case of a kick down type downshift or may be in engine overrunning condition in the case of a reducing road speed type downshift, simply the fourth clutch 44 is smoothly disengaged, with the fifth clutch 45 previously disengaged if it had been engaged. Since at this time the second clutch 41 is already engaged, hence no particular complicated mutual control of the fourth clutch 44 and the second clutch 41 is required for the downshifting; this is another particular good feature of the present invention.

As the fourth clutch 44 becomes disengaged, if this is a case of a kick down type downshift, then the rotational speed of the internal combustion engine 100 will quickly increase to a rotational speed at which the first one way clutch 40 will stop running free, so that now rotational power starts to be transmitted from the crankshaft 101 of the engine 100 through the second clutch 41 and the first one way clutch 40 to the second driving gear wheel shaft 2, and thence via the fourth speed driving gear 22 to the fourth speed driven gear 32 engaged therewith which transmits said rotation via the splines 63 and the second/fourth synchronizer 60 engaged thereto to the driven gear wheel shaft 4, thus outputting rotational power, now at a gearing ratio appropriate to the fourth speed stage.

On the other hand, as the fourth clutch 44 becomes disengaged, if this is not a case of a kick down type downshift, but is a case of a power off type downshift, then at this time automatically the first one way clutch 40 continues to run free or overrun, and the vehicle is allowed to free wheel or coast. As explained above, engine braking may be available, in this first preferred embodiment, in the fourth speed state, by subsequently engaging the third clutch 42.

Thus the vehicle comes to operate in the fourth speed stage. At a convenient time, such as after the lapse of a predetermined time, during running in the fourth speed stage, the synchronizer sleeve 74 of the third/fifth synchronizer 70 may be returned to the intermediate position, so as to stop the fourth clutch 44 and the fifth clutch 45 from slipping and so as to preserve the life of said fourth and fifth clutches 44 and 45.

REVERSE SPEED STAGE

In the reverse speed state, all of the first speed synchronizer sleeve 53 of the first speed synchronizer 50, the second/fourth synchronizer sleeve 64 of the second/fourth synchronizer 60, and the third/fifth synchronizer sleeve 74 of the third/fifth synchronizer 70 are set to their intermediate positions by said transmission control system, and the reverse idler gear 28 is shifted in the rightwards direction in FIG. 1 along the reverse idler gear shaft 27 by the transmission control system via a fork or the like of a per se well known sort, so that said reverse idler gear 28 engages both with the reverse speed driving gear 26 fixedly mounted on the first driving gear wheel shaft 1 and also with the reverse speed driven gear 36 fixedly mounted on the driven gear wheel shaft 4. Further, the first clutch 10 is engaged, while the second through fifth clutches 41, 42, 44, and 45 are disengaged. Thus, the rotation of the crankshaft 101 of the engine 100 is transmitted via the first clutch 10 and the torque converter 5 to the first driving gear wheel shaft 1, and thence is transmitted via the reverse driving gear 26 and the reverse idler gear 28 and the reverse driven gear 36 to the driven gear wheel shaft 4, thus rotating this driven gear wheel shaft 4 in the reverse rotational sense to that rotational sense in which said member was rotated in all the other speed stages whose operation has been explained above. Engine braking is of course available in this reverse speed stage, since no one way clutch is present in the force transmission path. When the vehicle is driven away backwards from rest and operates in the reverse speed stage, the per se well known cushioning effect of the fluid torque converter 5 is effective for mediating this reverse speed starting off action. Accordingly, again, no particularly delicate or subtle clutch operation is required for starting the vehicle away from rest in the reverse speed stage.

SUMMARY OF THE FIRST PREFERRED EMBODIMENT

According to this functioning of the first preferred embodiment, described above, during the engagement of any one of the speed stages, it is possible to prepare for the engagement of the next speed stage required, in other words to make preliminary preparations for the engagement of the next higher or the next lower speed stage. This is possible because alternate speed stages are provided by different ones of the three different power transmission systems which are provided between the crankshaft 101 of the internal combustion engine 100 and the driven gear wheel shaft 4, and thus the power transmission system relating to the next speed stage can be prepared for the subsequent engagement of that next speed stage while still the current speed state is being engaged; and after this preparation the actual shifting between speed stages can be performed by altering the engagement conditions of the first, second, and third clutching assemblies 301, 302, and 303.

Now, because of the provision of the first and second one way clutches 40 and 43, i.e. because the second and third clutching assemblies 302 and 303 have the function of providing one way transmission of rotational power in a certain operational mode, and because the torque converter 5 is also capable of a limited amount of slippage between its rotational power input member (the pump impeller 6) and its rotational power output member (the turbine runner 7) in substantially a similar overrunning operational fashion, it is not necessary to operate the clutching assemblies 301, 302, and 303 together in any extremely closely related fashion, and accordingly timing problems with regard to finely synchronized simultaneous operation of these clutching assemblies 301, 302, and 303 again do not arise. Thus, both in the case of an upshift and in the case of a power on downshift or a so called kick down type downshift, this change between speed stages is accomplished smartly and positively, as is desirable.

Next, the particularly important beneficial feature of the present invention is that the torque converter 5 is provided only in the rotational force transmission path which includes the first clutching assembly 301, i.e. in the rotational force transmission path of the first power transmission system which provides the first and reverse speed stages only; and the torque of the internal combustion engine 100 is during the engagement of the other power transmission systems transmitted directly via the outer casing 305 of the multi clutching mechanism 304 to the power input member of the relevant clutch, i.e. of the appropriate one of the second through fifth clutches 41 through 45, bypassing said torque converter 5. Since the action of this torque converter 5 is for providing smooth starting off from rest, without requiring any particularly subtle or delicate clutch operation, which is of course only required to be performed in the first and the reverse speed stages, this means that the torque cushioning action of the torque converter 5 is only available and provided during the engagement of the particular one of the power transmission systems in the operation of which said torque cushioning action is required, and otherwise no substantial energy is required for churning of hydraulic fluid uselessly within this torque converter 5. Further, a particular beneficial feature of the shown first preferred embodiment of the present invention is that the provision of the torque converter cutoff clutch or first clutch 10 between the outer casing 305 of the multi clutching mechanism 304 and the pump impeller 6 of the torque converter 5 ensures that in other speed stages than the first and reverse speed stages no rotational power at all need be transmitted to this torque converter 5, and hence the amount of power expended is uselessly rotating said torque converter 5 is precisely zero.

Further, because of the provision of the operational mode, for both the second and third clutching assemblies 302 and 303, in this first preferred embodiment, of transmission of rotational power in both rotational directions, i.e. because of the provision of the third clutch 42 which bypasses the first one way clutch 40 and of the fifth clutch 45 which bypasses the second one way clutch 43, thus engine braking is made available in those speed stages of the transmission mechanism which are provided by the power transmission systems associated with those second and third clutching assemblies 302 and 303, i.e. in the second, third, fourth, and fifth speed stages. Engine braking is also available, of course, in the first and reverse speed stages, since no one way clutch is incorporated in the power transmission path thereof at all. If either one of these bypass clutches 42 or 45 is engaged for providing engine braking before a changeover of speed stage of the transmission mechanism, i.e. before an upshift or a downshift, it should be disengaged shortly before or in the preliminary phase of the shifting process, as explained in detail above.

Now, this first preferred embodiment has the following particular constructional advantages.

First, the clutching assemblies 301, 302, and 303 are all integrated together into the multi clutching mechanism 304, which is located between the rest of the transmission mechanism and the internal combustion engine 100. This is important because the diameters of the first through fifth clutches 10, 41, 42, 44, and 45 may be required to be considerably large; and in particular may be required to be large compared to the diameters of the various gear wheels of the gear transmission mechanism. Now, in the case of a front engine rear wheel drive vehicle, where the transmission is typically mounted under the firewall or bulkhead separating the engine room from the passenger compartment thereof, typically there is considerable space available at the front end of the transmission where it is attached to the engine, but very little space available at the rear end of the transmission where it is attached to the propeller shaft. In such a construction, therefore, it is particularly beneficial for the various clutching devices, which as explained above are the elements of the transmission which are of particularly large diameter, to be concentrated together at the front end of the transmission, as in the shown first preferred embodiment of the present invention; this is extremely helpful for fitting the transmission in place without causing any undesirable hump in the transmission tunnel formed along the floor of the vehicle, and without any such constraint occurring as that the entire transmission should be forced to be mounted forward of the bulkhead, for example. Accordingly, this construction of the first preferred embodiment provides it with particularly good mountability.

THE SECOND PREFERRED EMBODIMENT

Figure 2:
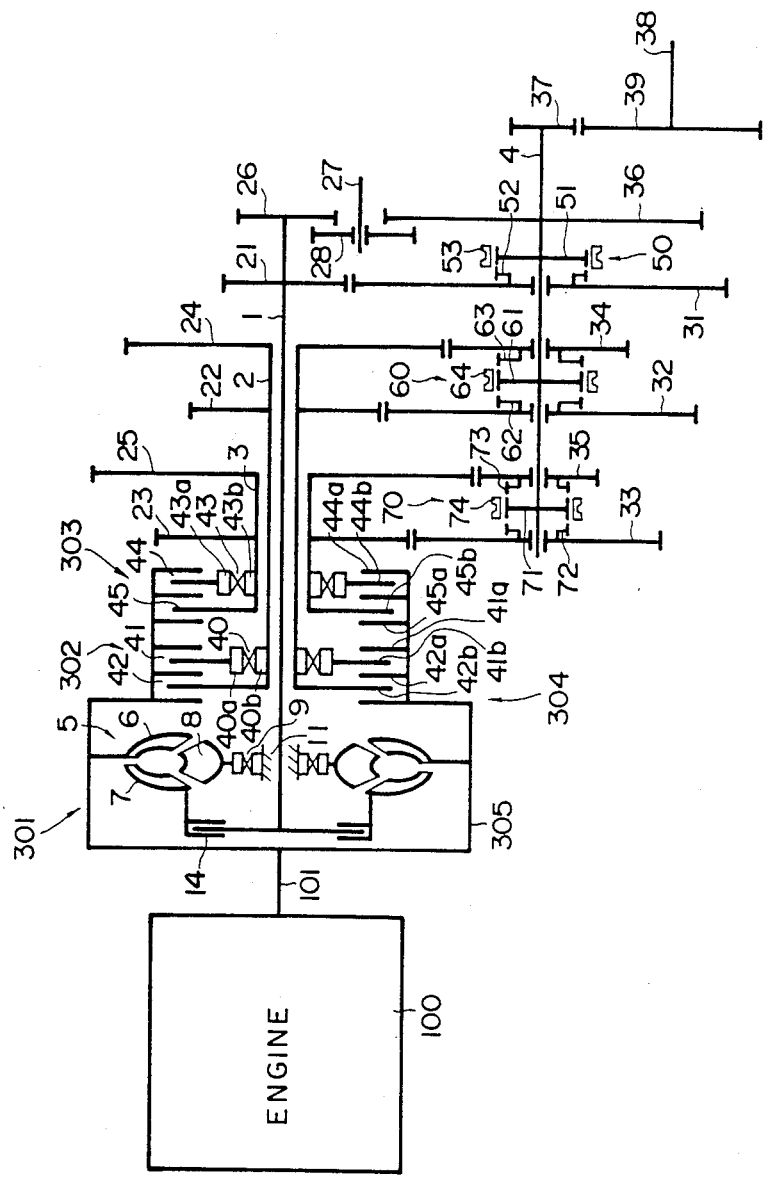
FIG. 2 is a schematic skeleton structural view, similar to FIG. 1, showing a second preferred embodiment, which provides essentially the same function as the first preferred embodiment via a different construction, in which the clutch is connected in series after the torque converter instead of before it.

FIG. 2 is a schematic skeleton structural view of a transmission mechanism which is a second preferred embodiment of the transmission mechanism according to the present invention. In this figure, parts of the second preferred embodiment shown, which correspond to parts of the first preferred embodiment shown in FIG. 1, and which have the same functions, are designated by the same reference numerals and symbols as in that figure.

In this second preferred embodiment, the construction and function of the second and third clutching assemblies 302 and 303, and of the first through third driving gear wheel shafts 1, 2, and 3 and of the driven gear wheel shaft 4 and of the various gear wheels mounted on these shafts, is exactly the same, as in the case of the first preferred embodiment shown in FIG. 1. Thus in this second preferred embodiment, as in the first preferred embodiment, the second and third clutching assemblies 302 and 303 are parallel—series type three mode type clutching assemblies. Further, the function of the first clutching assembly 301 is substantially the same, as in the case of the first preferred embodiment shown in FIG. 1. Thus, the method of operation of the first through the third clutching assemblies 301, 302, and 303 in order to provide the various speed stages of the transmission, is also the same, as is the overall method of operation of the transmission mechanism. However, in this second preferred embodiment, the construction of this first clutching assembly 301 is different.

In detail, the pump impeller 6 of the torque converter 5, in this second preferred embodiment, is coupled directly to the outer casing 304 of the multiple clutching mechanism 304, and the first clutch 10 is not provided between these two members. Instead a clutch 14, which functionally corresponds to said first clutch 10 of the first preferred embodiment, is provided between the first driving gear wheel shaft 1 and the turbine member 7 of the torque converter 5. In this connection, the clutch 14, as schematically suggested in FIG. 2, which is required to be connected between a member of relatively large radius and a member of relatively small radius, will conveniently be constructed of a substantially smaller radius, than the first clutch 10 of the first preferred embodiment shown in FIG. 1, which was required to be connected between two members of relatively large radius.

Thus, functionally, the operation is substantially the same as in the first preferred embodiment, with the operation of the clutch 14 substituted for the operation of the first clutch 10, since again the first clutching assembly 301 comprising the torque converter 5 is provided in series in the rotational force transmission path of the first power trnsmission system comprising the first and reverse speed stage driving and driven gear wheels 21, 31, 26, and 36 and the first speed synchronizer 50 which can provide the first speed stage between the crankshaft 101 of the internal combustion engine 100 and the first driven gear wheel shaft 3, and said first clutching assembly 301 including the torque converter 5 has substantially the same operational function, and only the details of the construction of this first clutching assembly 301 are altered. However, this alteration of the constructional details may be particularly important for the actual construction of the transmission, depending upon circumstances. The functioning of this second preferred embodiment will not be described in detail. In order to shift the transmission mechanism shown in FIG. 2 to its various speed stages, the engagement conditions of the various clutches and synchronizers and one way clutches shown in Table I will apply, with the clutch 14 substituted for the first clutch 10.

Since in this second preferred embodiment the clutch 14 is located at a different position in the first clutching assembly 301, the external shape of the transmission casing will be distinctly different from the external shape of the casing of a transmission according to the first preferred embodiment. Thus, this second embodiment may be more suitable for fitting to some particular patterns of automotive vehicle, in which fitting space may be particularly limited, according to circumstances. In this second preferred embodiment, the feature of the first preferred embodiment that the torque converter 5 is totally disconnected from the source of rotational power, i.e. from the crankshaft 101 of the internal combustion engine 1, during the engagement of all speed stages other than the first and reverse speed stages, is not available, and in fact in these other speed stages the pump impeller 6 of the torque converter 5 remains rotationally connected to the housing 305 of the multiple clutching mechanism 304 and to said crankshaft 101, and accordingly the torque converter 5 as a whole continues to rotate as a unitary mass; but since the power output member of the torque converter 5, i.e. its turbine runner 7, is not rotationally connected to any member, no substantial power loss in the torque converter 5 will occur, because the torque converter 5 is operating under the no load condition. Also, as a peripheral advantage, when the first speed driven gear 31 is rotationally connected to the driven gear wheel shaft 4 via the first speed synchronizer 50 during the engagement of the second speed stage, as for example when preparing to shift to the first speed stage, no rotational power is input to the turbine runner 7 of the torque converter 5 from the first driving gear wheel shaft 1 at all; and this saves a certain small amount of energy.

THE THIRD PREFERRED EMBODIMENT

Figure 3:
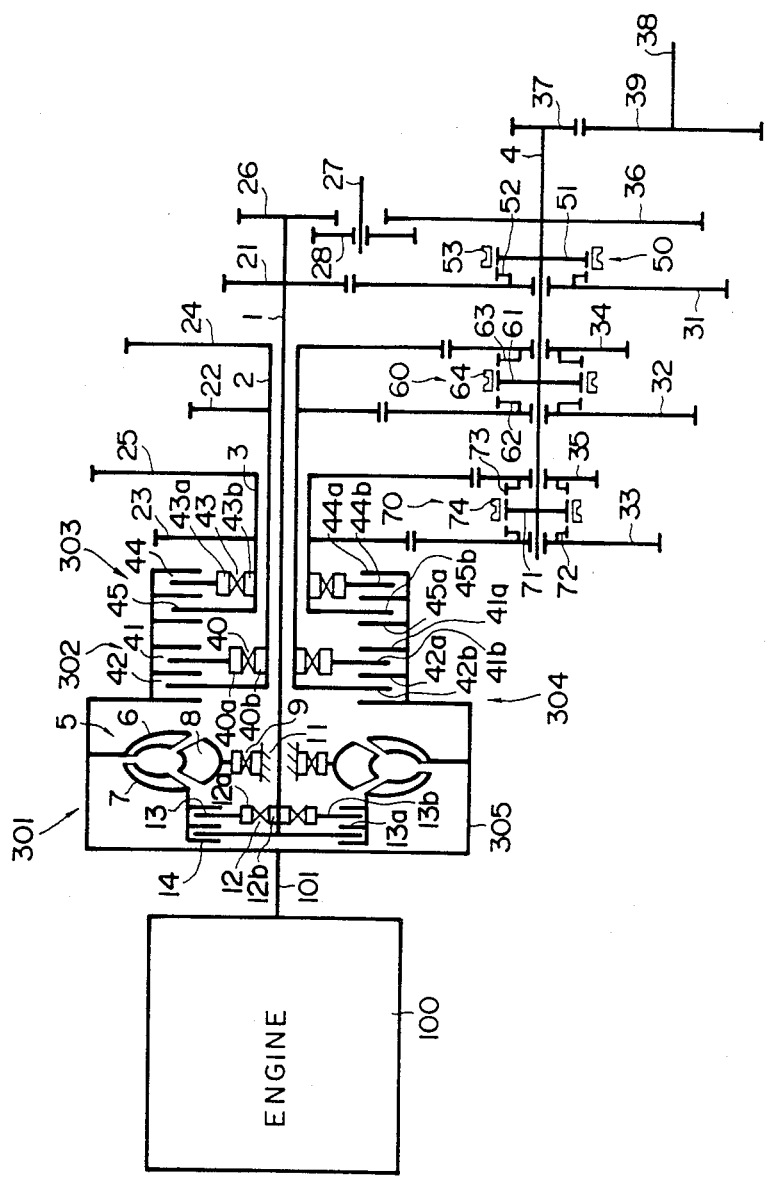
FIG. 3 is a schematic skeleton structural view, similar to FIG. 1 and FIG. 2, showing a third preferred embodiment, which is similar to the second preferred embodiment, but additionally includes a one way clutch in series with another clutch, the combination being connected in parallel with the abovementioned clutch of the second embodiment after the torque converter.

FIG. 3 is a schematic skeleton structural view of a transmission mechanism which is a third preferred embodiment of the transmission mechanism according to the present invention. In this figure, parts of the third preferred embodiment shown, which corresponds to parts of the first and second preferred embodiments shown in FIGS. 1 and 2, and which have the same functions, are designated by the same reference numerals and symbols as in those figures.

In this third preferred embodiment, the construction and function of the second and third clutching assemblies 302 and 303, and of the first through third driving gear wheel shafts 1, 2, and 3 and of the driven gear wheel shaft 4 and of the various gear wheels mounted on these shafts, is exactly the same, as in the case of the first preferred embodiment shown in FIG. 1. Thus in this third preferred embodiment, as in the first and second preferred embodiments, the second and third clutching assemblies 302 and 303 are parallel—series type three mode type clutching assemblies. On the other hand, neither the construction nor the function of the first clutching assembly 301 is the same, as in the case of the first preferred embodiment shown in FIG. 1.

In detail, describing this third preferred embodiment in terms of its differences from the second preferred embodiment shown in FIG. 2, within a clutch casing 306 of the clutch 14, which is similar to the clutch 14 of the second embodiment, another clutch 13 is provided, comprising a power input member 13a which is connected to the clutch casing 306 and a power output member 13b which is rotationally connected to the power input member 12a of a first/reverse one way clutch 12, the power output member 12b of which is rotationally connected to the left hand end in the figure of the first driving gear wheel shaft 1. Thus, the clutch 14 is connected in parallel with the series combination of the first/reverse one way clutch 12 and the clutch 13, and this parallel combination is connected between the turbine runner 7 of the torque converter 5 and the first driving gear wheel shaft 1. Again, the construction of each of the clutches 13 and 14, and of the first/reverse one way clutch 12, is per se well known, and the handedness of the first/reverse one way clutch 12 is similar to the hardednesses of the first and second one way clutches 40 and 43. The pump impeller 6 of the torque converter 5, in this third preferred embodiment, is coupled directly to the outer casing 305 of the multiple clutching mechanism 304, and the first clutch 10 is not provided between these two members. Thus, the first clutching assembly 301 functions as a series combination of a torque converter and a parallel—series clutching assembly of the type described above with respect to the second and third clutching assemblies 302 and 303 of the first and second preferred embodiments.

The differences in the operation of this third preferred embodiment from that of the first preferred embodiment are as follows. The clutch 13 is controlled in substantially the same way as was the clutch 10 of the first preferred embodiment, so as to start the vehicle off from rest in the first or the reverse speed stage; and also the clutch 13 is controlled as was the clutch 10 of the first preferred embodiment, during shifting between the first and the second speed stages, both upshifting and downshifting. Further, when engine braking is required during the engagement of the first or the reverse speed stage, as for example when the stepping on of the accelerator pedal of the vehicle is released, then the clutch 14 is engaged, so as to bypass the action of the first/reverse one way clutch 12, in a similar fashion to the operation of the bypass clutches 42 and 45 of the previously described embodiments in the second to the first speed stages. On the other hand, during shifting between the first and the second speed stages, both upshifting and downshifting, the clutch 14 is disengaged before the shifting procedure is substantially commenced, so as not to cause any locking up problem with regard to the transmission mechanism.

This third preferred embodiment has the substantial advantage that during an upshift from the first speed stage to the second speed stage no reliance is made upon the slipping action of the torque converter 5 to prevent locking up of the transmission mechanism, during the transient time period in which both the clutch 13 (corresponding to the first clutch 10 of the first and second preferred embodiments) and the second clutch 41 are engaged. As explained previously, such an overlap engagement time period for the clutch 13 and the second clutch 41 will occur during such upshifting. Instead, the one way free wheeling action of the first/reverse one way clutch 12 is relied upon. Since this action of the first/reverse one way clutch 12 is much more easy and sure than the slipping action of the torque converter 5, and does not depend upon the relative smallness of the slippage amount required, the overlap engagement period for the clutch 13 and the second clutch 41 can be made relatively longer than in the first two preferred embodiments described, which is beneficial with regard to the required control characteristics of the transmission as a whole, and with regard to its durability during service. Further, similar advantages accrue during a downshift from the second speed stage to the first speed stage: such a downshift may be crisply and quickly accomplished simply by disengaging the second clutch 41. Details will easily be supplemented by one of ordinary skill in the transmission art, based upon the disclosures herein.

Thus, the functioning of this third preferred embodiment will not be described in detail. The external shape of the transmission casing will be similar to that in the second preferred embodiment, but of course the construction and operation are somewhat more complicated. In this third preferred emodiment, the feature of the first preferred embodiment that the torque converter 5 is totally disconnected from the source of rotational power, i.e. from the crankshaft 101 of the internal combustion engine 1, during the engagement of all speed stages other than the first and reverse speed stages, is not available, as was the case in the second preferred embodiment.

The necessary adjustments which require to be made to the engagement and disengagement conditions shown in Table I in order to obtain the five forward speed stages of the transmission mechanism shown in FIG. 3, and engine braking in these speed stages, will be apparent to one of ordinary skill in the art, based upon the explanations herein.

THE FOURTH PREFERRED EMBODIMENT

Figure 4:
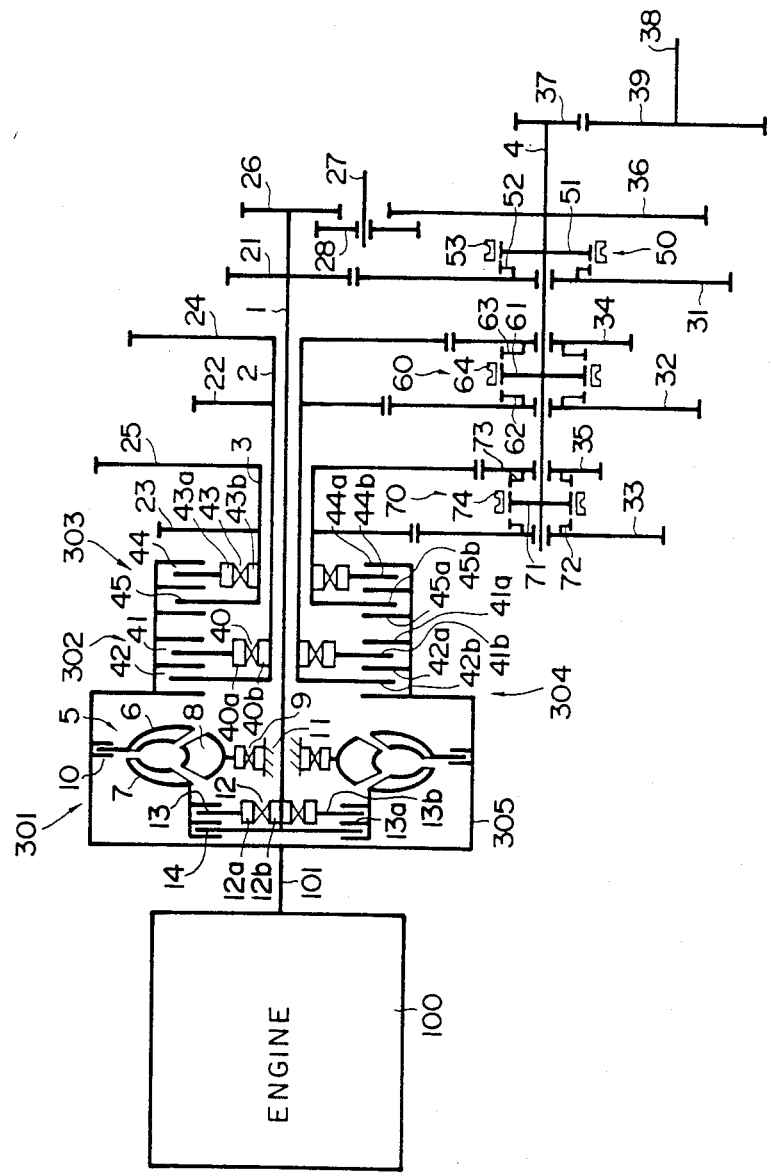
FIG. 4 is a schematic skeleton structural view, similar to FIGS. 1 through 3, showing a fourth preferred embodiment of the transmission mechanism, which is similar to the third preferred embodiment, but additionally includes another clutch connected in series before the torque converter.

FIG. 4 is a schematic skeleton structural view of a transmission mechanism which is a fourth preferred embodiment of the transmission mechanism according to the present invention. In this figure, parts of the fourth preferred embodiment shown, which correspond to parts of the first through third preferred embodiments shown in FIGS. 1 through 3, and which have the same functions, are designated by the same reference numerals and symbols as in those figures.

In this fourth preferred embodiment, the construction and function of the second and third clutching assemblies 302 and 303, and of the first through third driving gear wheel shafts 1, 2, and 3 and of the driven gear wheel shaft 4 and of the various gear wheels mounted on these shafts, is exactly the same, as in the case of the first through third preferred embodiments shown in FIGS. 1 through 3. Thus in this fourth preferred embodiment, as in the first through the third preferred embodiments, the second and third clutching assemblies 302 and 303 are parallel—series type three mode type clutching assemblies. On the other hand, the first clutching assembly 301 is constructed, effectively, as the combination of the first clutching assemblies of the first and the third preferred embodiments. In other words, as well as the clutches 13 and 14 and the first-/reverse one way clutch 12 being provided in a parallel—series type arrangement between the turbine runner 7 of the torque converter 5 and the first driving gear wheel shaft 1, as in the third preferred embodiment, also a first clutch 12 as provided in the first preferred embodiment is provided between the housing 305 of the multiple clutching mechanism 304 and the pump impeller 6 of said torque converter 5.

Thus, in addition to the special beneficial functions already explained with respect to the third preferred embodiment, the additional benefit that was available in the first preferred embodiment, that in other speed stages than the first and reverse speed stages no rotational power at all need be transmitted to the torque converter 5, and hence the amount of power expended in uselessly rotating said torque converter 5 is precisely zero, is available. With regard to the operation of this fourth preferred embodiment, the operation of the third preferred embodiment should be followed, with the additional detail that the first clutch 10 should be operated together with the clutch 13. The necessary adjustments which require to be made to the engagement and disengagement conditions shown in Table I in order to obtain the five forward speed stages of the transmission mechanism shown in FIG. 4, and engine braking in these speed stages, will be apparent to one of ordinary skill in the art, based upon the explanations herein.

SUMMARY

Thus, in all the first through the fourth preferred embodiments disclosed above, the advantage is obtained that by the mediation of the fluid torque converter 5 the vehicle can be started off smoothly from rest, without requiring any particular subtle or delicate operation of any of the clutches. On the other hand, during operation in any speed stage other than the first and reverse speed stages, the fluid torque converter 5 is bypassed. Accordingly, during operation of the vehicle, the minimum practicable amount of energy is used in churning the fluid of the torque converter 5. Thus, the fuel economy and the performance characteristics of the vehicle during operation are improved.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

TABLE I

| ASSEMBLY | SPEED STAGE | 1 | 2 | 3 | 4 | 5 | R |
|---|---|---|---|---|---|---|---|
| 301 | CLUTCH 10 | E | D | D | D | D | E |
| 302 | CLUTCH 41 | D/e | E | D/e | E | D/e | D |
|  | ONE WAY CLUTCH 40 | O | A | O | A | O | O |
|  | CLUTCH 42 | D | B | D | B | D | D |
| 303 | CLUTCH 44 | D/e | D/e | E | D/e | E | D |
|  | ONE WAY CLUTCH 43 | O | O | A | O | A | O |
|  | CLUTCH 45 | D | D | B | D | B | D |
| 50 | SPLINES 52 | E | D/e | D | D | D | D |
| 60 | SPLINES 62 | D/e | E | D/e | D | D | D |
|  | SPLINES 63 | D | D | D/e | E | D/e | D |
| 70 | SPLINES 72 | D | D/e | E | D/e | D | D |
|  | SPLINES 73 | D | D | D | D/e | E | D |

What is claimed is:

1. A transmission mechanism comprising: a rotational input member; an output shaft; a fluid torque converter; a first on-off clutch; a second on-off clutch; a third on-off clutch; a first one way clutch; a second one way clutch; a first gear train having a first reduction gear ratio; a second gear train having a second reduction gear ratio smaller than said first reduction gear ratio; a third gear train having a third reduction gear ratio smaller than said second reduction gear ratio; a fourth gear train having a fourth reduction gear ratio smaller than said third reduction gear ratio; a first gear train having a fifth reduction gear ratio smaller than said fourth reduction gear ratio; a first synchronizer which connects said input member and said output shaft via a first power line including a series connection of said fluid torque converter, said first on-off clutch, and said first gear train when said first synchronizer is shifted to a first side of a neutral position thereof so as to transmit rotational power from said input member to said output shaft in a normal rotational direction; a second synchronizer which connects said input member and said output shaft via a second power line including a series connection of said second on-off clutch, said first one way clutch, and said second gear train when said second synchronizer is shifted to a first side of a neutral position thereof so as to transmit rotational power from said input member to said output shaft in a normal rotational direction and which connects said input member and said output shaft via a fourth power line including a series connection of said second on-off clutch, said first one way clutch, and said fourth gear train when said second synchronizer is shifted to a second side of said neutral position so as to transmit rotational power from said input member to said output shaft in said normal rotational direction; and a third synchronizer which connects said input member and said output shaft via a third power line including a series connection of said third on-off clutch, said second one way clutch, and said third gear train when said third synchronizer is shifted to a first side of a neutral position thereof so as to transmit rotational power from said input member to said output shaft in said normal rotational direction and which connects said input member and said output shaft via a fifth power line including a series connection of said third on-off clutch, said second one way clutch, and said fifth gear train when said third synchronizer is shifted to a second side of said neutral position of said second synchronizer so as to transmit rotational power from said input member to said output shaft in said normal rotational direction.

2. A transmission mechanism according to claim 1, further comprising a fourth on-off clutch arranged in parallel with said first one way clutch.

3. A transmission mechanism according to claim 1, further comprising a fifth on-off clutch arranged in parallel with said second one way clutch.

4. A transmission mechanism according to claim 1, further comprising a fourth on-off clutch arranged in parallel with said first one way clutch, and a fifth on-off clutch arranged in parallel with said second one way clutch.

5. A transmission according to claim 1, further comprising a fourth on-off clutch and a third one way clutch connected in series and incorporated in series in said first power line.

6. A transmission mechanism according to claim 5, further comprising a fifth on-off clutch arranged in parallel with said fourth one way clutch.

7. A transmission according to claim 1, wherein said first power line comprises a first intermediate shaft, said second and fourth power lines comprise a second intermediate shaft as a part common thereto, and said third and fifth power lines comprise a third intermediate shaft as a part common thereto, said first, second, and third intermediate shafts being telescopingly arranged to rotate coaxially with said input member, said torque converter, said first, second, and third on-off clutches, and said first, and second one way clutches, said first intermediate shaft being the innermost and said third intermediate shaft being the outermost.

* * * * *

UNITED STATES PATENT AND TRADEMARK OFFICE
CERTIFICATE OF CORRECTION

PATENT NO. : 4,548,101
DATED : October 22, 1985
INVENTOR(S) : Teruo Akashi et al.

It is certified that error appears in the above-identified patent and that said Letters Patent is hereby corrected as shown below:

Column 2, line 57, after "vehicle" add a comma, and change "such as" to --such a--.

Column 4, line 19, change "system" to --systems--.

Column 7, line 48, change "Further, the clutching" to --Further, the third clutching--.

Column 9, line 58, change "driving gear 31" to --driven gear 31--.

Column 11, line 47, change "like or a" to --like of a--.

Column 16, line 14, change "drivve" to --drive--.

Column 16, line 40, change "UNSHIFTING" to --UPSHIFTING--.

Column 17, line 44, change "ic currently" to --is currently--.

UNITED STATES PATENT AND TRADEMARK OFFICE
CERTIFICATE OF CORRECTION

PATENT NO. : 4,548,101

DATED : October 22, 1985

INVENTOR(S) : Teruo Akashi et al.

Page 2 of 3

It is certified that error appears in the above-identified patent and that said Letters Patent is hereby corrected as shown below:

Column 23, line 5, change "state," to --stage,--.

Column 23, line 17, change "state," to --stage,--.

Column 24, line 1, change "state" to --stage--.

Column 24, line 58, changed "expended is" to --expended in--.

Column 25, line 24, change "front engine" to --front engined--.

Column 26, line 24, omit the comma after "radius".

Column 27, line 64, change "hardednesses" to --handednesses--.

Column 28, line 23, change "first" to --fifth--.

Column 29, line 4, change "which require" to --which are required--.

UNITED STATES PATENT AND TRADEMARK OFFICE
CERTIFICATE OF CORRECTION

PATENT NO. : 4,548,101
DATED : October 22, 1985
INVENTOR(S) : Teruo Akashi et al.

It is certified that error appears in the above-identified patent and that said Letters Patent is hereby corrected as shown below:

Column 29, line 42, change "clutch 12" to --clutch 10--.

Column 30, line 54, change "a first gear" to --a fifth gear--.

Signed and Sealed this

Fifteenth Day of April 1986

[SEAL]

Attest:

Attesting Officer

DONALD J. QUIGG

Commissioner of Patents and Trademarks